United States Patent Office 3,170,671
Patented Feb. 23, 1965

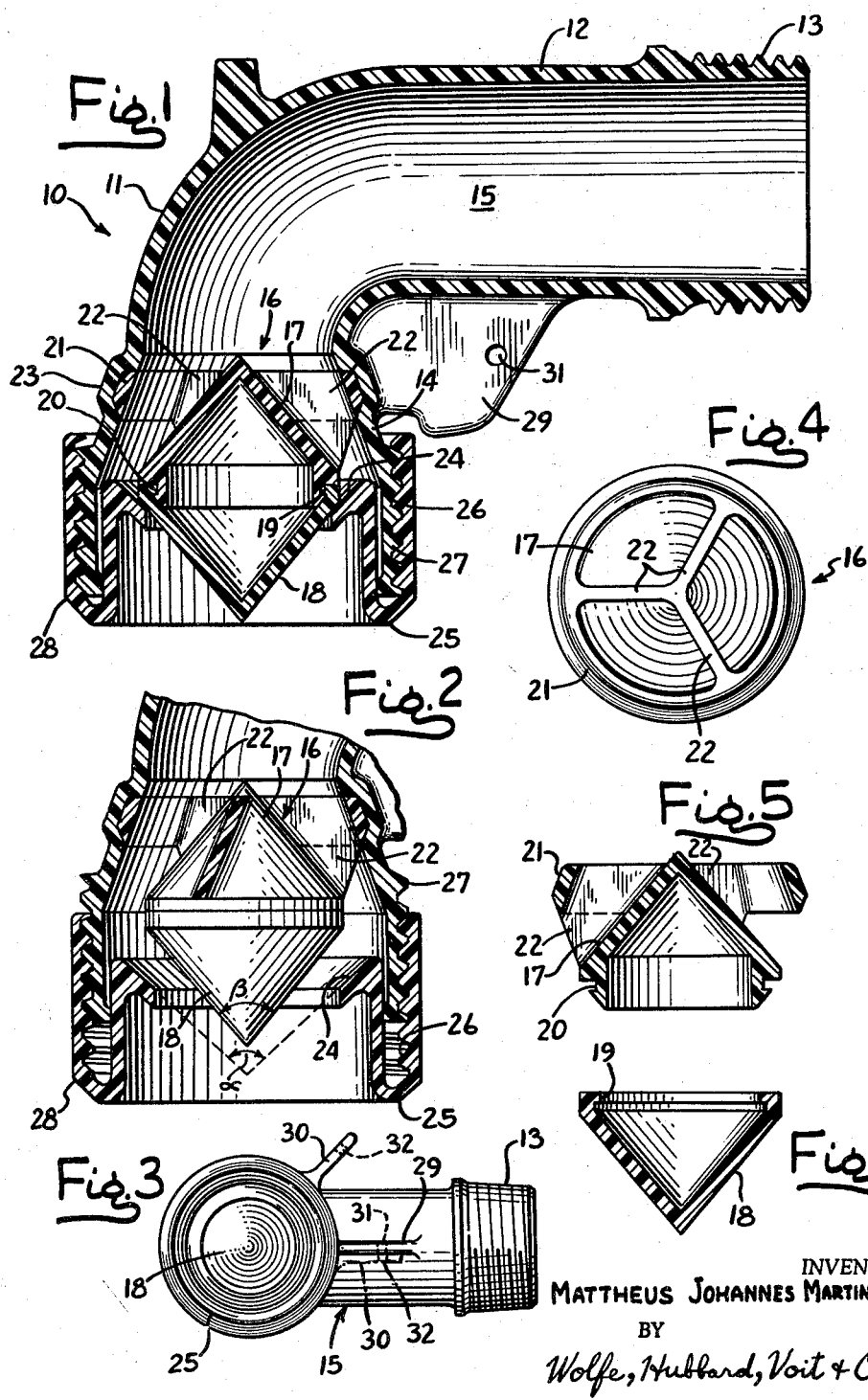

3,170,671
ANGLE COCK
Mattheus Johannes Martinus Coppens, Delft, Zuid-Holland, Netherlands, assignor, by mesne assignments, to Inland Steel Company, Chicago, Ill., a corporation of Delaware
Filed Mar. 2, 1962, Ser. No. 176,938
Claims priority, application Great Britain, Mar. 3, 1961, 7,812/61
8 Claims. (Cl. 251—350)

The present invention relates generally to fluid regulating devices and, more particularly, to an improved angle cock for controlling the discharge of fluid from a fluid source.

It is a general aim of the present invention to provide an improved angle cock having a comparatively large output or discharge capacity in terms of quantity of fluid discharged per unit of time, yet characterized by the fact that the flow rate of the jet is easily adjustable and wherein the jet at all rates of flow does not splash. A related object of the invention is to provide an angle cock characterized by its ability to produce a confined jet having a small diameter and which is rod-like in configuration at all rates of flow rather than being tubular or hollow in configuration.

While not so limited in its application, the invention will find especially advantageous use when pouring or discharging aggressive, corrosive, poisonous, volatile, combustible and/or highly inflammable liquids, or liquids which are obnoxious in any other respect. When used with such obnoxious liquids, the large discharge capacity of the cock, quite apart from the time saving aspect, affords an additional advantage in that the period of time during which the liquid is in open contact with the ambient atmosphere is reduced to a minimum. And obviously, when used to discharge such obnoxious liquids it is particularly important to be able to pour with a smooth, confined, non-splashing, and preferably laminar non-turbulent jet.

A further object of the invention is to provide a cock which has a positive and externally controlled closing action and which is inexpensive to manufacture and comprises a small number of parts.

More specifically, it is an object of the invention to provide an angle cock having a relatively small external diameter which permits the cock to be received within a bung formed in a drum or other appropriate container. In this connection, it is an object of the invention to provide a cock having an outlet nozzle which does not protrude more than a limited distance beyond the center of the orifice into which it is to be fitted.

In another of its aspects, an object of the invention is to provide an improved angle cock made of a macromolecular material such as thermoplastic or thermosetting synthetic material, the cock being constructed so as to take advantage of the beneficial characteristics of such materials while avoiding the disadvantages of such materials. For example, the construction is such that small deformations or the like in the cooperating parts will not impair the effectiveness of the cock irrespective of whether the latter is in its closed position, its fully open position, or in any intermediate position.

Other objects and advantages of the invention will become apparent as the following description proceeds, taken in conjunction with the accompanying drawing, in which:

FIGURE 1 is a vertical longitudinal cross-sectional view of an angle cock embodying the features of the present invention, here showing the cock in its closed position;

FIG. 2 is a fragmentary view similar to FIG. 1 and illustrating the cock in its partly opened position;

FIG. 3 is an inverted plan view on a reduced scale of the angle cock shown in FIGS. 1 and 2;

FIG. 4 is a plan view of the obturating member used with the exemplary angle cock shown in FIG. 1;

FIG. 5 is a vertical cross-sectional view of the upstream portion of the obturating member; and FIG. 6 is a vertical cross-sectional view of the downstream portion of the obturating member.

While the invention is susceptible of various modifications and alternative constructions, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternative constructions falling within the spirit and scope of the invention as expressed in the appended claims.

Referring more specifically to FIG. 1, there is illustrated an exemplary angle cock, generally indicated at 10, embodying the features of the present invention and including a casing 11 having a spigot end 12 provided with external screw threads 13. The casing also includes a discharge end 14 which is disposed at an angle to the spigot end 12 and which defines therewith a flow channel 15 having a substantially circular cross-section throughout the length of the casing 11. As best illustrated in FIG. 1, the junction between the spigot end 12 and the discharge end 14 of the casing 11 is formed as a smooth fluent bend, thus insuring that the flow channel 15 is void of sudden changes in both cross-sectional shape and area so as to promote smooth flow of liquid therethrough.

In accordance with one of the important aspects of the present invention, provision is made for varying the flow rate of fluid passing through the flow channel 15 so as to permit selective variation of the discharge capacity of the angle cock in terms of quantity of fluid discharged per unit of time, while at the same time insuring that the jet emanating from the discharge end 14 of the cock 10 is a confined, solid jet substantially free of turbulence and splash irrespective of the flow rate selected. In the exemplary form of the invention, this is accomplished by positioning obturating means within the discharge end 14 of the cock 10, the obturating means being readily adjustable from a position fully closing the flow channel 15 to a position either partially or fully opening the flow channel, yet wherein the shape of the discharge orifice remains substantially uniform at all possible positions of the obturating means.

In keeping with the foregoing aspect of the invention, the obturating means includes an obturating member 16 which is mounted within an enlarged or widened portion of the flow channel 15 in the discharge end 14 of the cock 10. As best illustrated in FIGS. 1, 5 and 6, the obturating member 16 comprises an upstream portion 17 having the shape of a hollow cone and a similarly shaped downstream portion 18, the two portions being secured to one another by an inwardly extending circumferential ridge 19 formed on the downstream cone 18 which engages a peripheral groove 20 formed in the upstream cone 17. One or both of the conical portions 17, 18 may be made of a slightly resilient material such, for example, as a synthetic resin. Since the lower annular extremity of the member 17 (as viewed in FIG. 5) is tapered, the two portions can be slid into one another, the annular ridge 19 snapping into the annular groove 20 due to the resiliency of the material. The barbed hook action of the ridge 19 and groove 20 serves to prevent accidental separation of the two parts.

In order to support the obturating member 16 coaxially within the discharge end 14 of the casing 11, the upstream conical portion 17 thereof is supported by a spider here shown as including an annular rim 21 and a plurality of angularly spaced apart spokes 22 (three such spokes being shown in FIG. 4) extending from the rim 21 to the conical portion 17 of the obturating member. The annular rim 21 is received within an annular groove 23 formed in the inner surface wall of the widened or enlarged portion of the flow channel 15. Preferably, the casing 11 or the spider, or both, are made of an elastically deformable material, thus permitting the spider to be snapped into the annular groove 23 and to be held in place by the elasticity of the material. In this manner, the assembly of the angle cock is considerably facilitated. Moreover, the construction is simplified since otherwise the casing 11 would have to consist of two separable portions which are secured to one another after the spider with its rim 21 is positioned in place with the groove 23.

Upon inspection of FIG. 1, it will be apparent to those skilled in the art that the cross-sectional area of the flow channel 15 upstream of the obturating member 16 is substantially uniform both in shape and area. In the exemplary form of the invention, the inner surface wall of the widened channel portion (i.e., that portion of the casing wall surrounding the upstream facing conical portion 17 of the obturating member 16) is formed as the wall of a truncated cone having an apex angle which is smaller than the apex angle of the cone 17, the apical ends of both the cone 17 and the truncated conical wall being directed upstream. The arrangement is such that the annular passage surrounding the obturating member 16 is of substantially uniform cross-sectional area and the dimensions have been so selected that this cross-sectional area is approximately equal to the cross-sectional area of the flow channel 15 upstream of the obturating member 16.

In carrying out the present invention, provision is made for selectively closing and opening the annular discharge passageway surrounding the obturating member 16. In the exemplary form of the invention shown in FIGS. 1 and 2, this is accomplished by mounting a closure member having an annular seat 24 on the discharge end 14 of the casing 11 with freedom for relative axial movement towards and away from the obturating member 16. It will be apparent to those skilled in the art that such relative movement can be achieved by either moving the closure member and its seat 24 towards (or away from) the obturating member 16 or by moving the obturating member 16 towards (or away from) the seat 24. However, the former arrangement has been illustrated in the exemplary form of the invention.

In order to selectively open and close the cock 10, the seat portion 24 of the closure member is formed on the innermost extremity of the inner wall of a double walled screw nut 25, which inner wall projects into the discharge end 14 of the casing 11. The outer wall of the screw nut 25 is provided with internal screw threads 26 which are in engagement with external screw threads 27 formed on the discharge end 14 of the casing 11.

As shown in the drawing, and particularly FIGS. 1 and 2, the downstream portion 18 of the obturating member 16 and the seat 24 cooperating therewith are so formed that the cross-section of the annular discharge orifice defined by the obturating member and the seat in all spaced apart positions of the latter is substantially similar in shape to the cross-section of the discharge orifice in the extreme spaced apart position of the seat and cone 18 (i.e., when the cock is fully opened), that is, annular. This constant similarity in shape of the cross-section of the discharge orifice, together with the fluent bend between the spigot end 12 and the discharge end 14 of the casing 11, insures that the jet discharged from the cock at all rates of delivery is a clear, confined, solid, straight and laminar stream of liquid which has no tendency to splash.

It has been found that these advantageous features of the discharged jet can be still further enhanced by forming the seat 24 with a cone shaped face having a slightly greater included apex angle than the apex angle of the conical portion 18 of the obturating member. Thus, as illustrated in FIG. 2, the apex angle $\alpha$ of the cone defining the seat 24 is slightly greater than the apex angle $\beta$ of the cone forming the downstream portion 18 of the obturating member 16. Merely by way of example, advantageous results have been obtained by selecting an apex angle $\alpha$ for the truncated conical seat on the order of 90° and an apex angle $\beta$ for the conical downstream portion of the obturating member 16 on the order of 80°.

The tendency to create turbulent conditions in the discharged stream of liquid is further considerably reduced by positioning the obturating member 16 as close to the extremity of the discharge end 14 as possible. At the same time it is desirable to position the obturating member 16 such that it does not protrude beyond the plane of the rim of the double walled screw nut 25 when the latter is screwed home to close the cock 10 (FIG. 1), thus preventing the obturating member 16 from being damaged when, for example, a container provided with the angle cock embodying the features of the present invention is placed on the ground. Moreover, the total height of the cock, and particularly the distance in which the outlet nozzle protrudes beyond the center of the spigot end is reduced to a minimum by such particular positioning of the obturating member 16.

As shown in FIGS. 1 and 2, the screw threads of the nut 25 and on the discharge end 14 of the casing 11 preferably have an asymmetrical cross-section, that is, the acute angle enclosed by the flanks of the screw threads remote from the extremity of the discharge end 14 (i.e., the upstream flanks) and the axis of the discharge orifice being greater than the angle between the opposite flanks of the screw threads and the axis of the discharge orifice. If, as in the exemplary form of the invention, the discharge end 14 of the casing 11, or the nut 25, or both, are made of a resiliently deformable material, the nut may be slid over the screw threads on the discharge end 14 into its operable position and need not be screwed onto the discharge end. Thus, the assembly of the cock is greatly facilitated while the asymmetrical cross-sectional shape of the screw threads still permits the annular seat 24 to be tightly screwed home onto the obturating member 16. Merely by way of example, advantageous results have been obtained by forming the screw threads in such a manner that the upstream flanks thereof define with the axis of the discharge end 14 an included angle on the order of 65°, while the opposite flanks define with the axis of the discharge end 14 an included angle on the order of 45°.

The screw threads 26, 27 on the nut 25 and the discharge end 14 of the casing 11 respectively are preferably of the buttress type, thus affording greater strength and greater resistance to cold flow which is particularly advantageous when the cooperating parts are made of some synthetic material such as polyethylene.

In order to prevent leakage through the screw threads 26, 27 in fully or partly opened positions of the cock as well as in closed positions of the cock, the inner surface of the discharge end 14 is formed with an inwardly projecting continuous ridge 28 which is in fluid-tight sliding engagement with the outer surface of the inwardly projecting inner wall of the double walled screw nut 25. Of course, those skilled in the art will appreciate that the continuous ridge could be formed directly on the external surface of the inner wall of the double walled screw nut 25 so as to be slidably received within the discharge end 14 of the casing 11 in fluid-tight engagement therewith.

In carrying out the present invention, stop means are provided for indicating when the cock is in its fully opened position. To this end, the casing 11 is provided with a wing or vane 29 while the nut 25 has formed thereon a similar wing or vane 30. The wings 29, 30 are so positioned that they engage one another in the fully opened position of the cock 10, thus limiting the fully opened position of the cock as indicated by the dotted lines shown in FIG. 3.

In order to provide a tamperproof and pilferproof seal, both wings or vanes 29, 30 have formed therein respective holes 31, 32 which are so positioned in relation to one another that when the angle cock 10 is in its fully closed position, the holes 31, 32 are alined. Thus, a seal wire (not shown) may be threaded through the alined holes 31 and 32 and, for example, be lead sealed so as to seal the cock and its associated container (not shown) in a tamperproof and pilferproof manner.

Those skilled in the art will appreciate that when wings 29, 30 are respectively provided on the casing 11 and the nut 25, the provision of a nut which can be slid over the screw threads due to the resiliency of either the nut or the discharge end 14 of the casing is especially advantageous since, if the nut had to be screwed onto the casing, it would be necessary to attach one of the wings to the cock 10 after assembly of the nut and the casing.

It will be appreciated that an angle cock embodying the features of the present invention will, in all positions of its closure member (that is, at all rates of delivery), discharge a clear, confined, solid, straight, laminar stream or jet free of any splash so that it can easily be aimed into a small filling orifice. The stream is void of turbulence to such a marked degree that it will be entirely transparent, provided, of course, that the liquid itself is transparent. The arrangement provides decided advantages over the more conventional angle cocks which emit streams or jets which, at all positions of control or all positions of the closure member, are bent, or splashed, or are subdivided to a number of separate jets which in some cases considerably diverge from one another.

While the exemplary form of the present invention has been described in connection with a casing 11 of single-piece construction, those skilled in the art will appreciate that it could be formed of two or more pieces. In an instance where the casing 11 is molded in two pieces, the plane of separation would preferably be located in the region of the groove 23 and the two parts united by the application of heat. In such a construction, the spider rim 21 and spokes 22, together with the cone 17 could be made integral with the discharge end of the casing.

I claim as my invention:

1. An angle cock comprising, in combination, a hollow casing defining a flow channel, said casing having a spigot end and an angularly related discharge end with the junction between the portions of said channel in said spigot and discharge ends being formed as a fluent bend, the discharge end of said casing terminating in an enlarged externally threaded portion defining a widened flow channel downstream of said bend, an obturating member positioned in the widened portion of said channel and defining with said discharge end an annular passageway having successive cross-sections of substantially uniform area, a double walled nut having internally disposed threads formed on its outer wall coupled with said externally threaded enlarged casing portion, the inner wall of said nut extending coaxially into said enlarged casing portion and terminating at its innermost extremity in an annular seat, said nut being coupled to said casing so that rotation of the former effects axial movement of said seat relative to said obturating member to selectively position said seat in engagement with and spaced apart from said obturating member, said nut adapted to hold said obturating and closure members in fixed positions relative to one another at all positions of said seat relative to said obturating member, said seat and said obturating member defining an annular discharge orifice at all possible spaced apart positions of said seat relative to said obturating member.

2. The combination set forth in claim 1 further characterized in that the screw threads on said discharge end and on said nut have an asymmetrical cross-section, the acute angle enclosed by the upstream flank of the screw threads and the axis of said discharge end being greater than the angle between the opposite flank of said screw threads and said axis.

3. The combination set forth in claim 2 further characterized in that said first named angle is approximately 65° and said second named angle is approximately 45°.

4. The combination set forth in claim 1 further characterized in that the coupling between said nut and said discharge end includes at least one member made of a resiliently deformable material which permits said nut to be slid over said externally threaded discharge end substantially into its operable position.

5. The combination set forth in claim 1 further characterized in that sealing means are interposed between said casing and said nut.

6. The combination set forth in claim 1 further characterized in that a continuous inwardly projecting sealing ridge is formed on said discharge end of said casing, said ridge being in slidable fluid tight contact with the inner wall of said nut.

7. An angle cock comprising, in combination, a hollow casing defining a flow channel, said casing having a spigot end and an angularly related discharge end with the junction between the portions of said channel in said spigot and discharge ends being formed as a fluent bend, the discharge end of said casing terminating in an enlarged portion defining a widened truncated conical casing wall downstream of said bend, an obturating member positioned in the portion of said channel defined by said wall, said obturating member having a first conical portion coaxial with and spaced from said wall, the apex angle of said first conical portion being greater than the apex angle of said wall with both said first conical portion and said wall positioned so that the apicad ends thereof are directed upstream, said conical portion defining with said wall an annular passageway, said obturating member having a second conical portion with its apicad end extending downstream, the apicad end of said second conical portion positioned relative to said discharge end so as to terminate substantially in the plane of said discharge end when said cock is in its fully closed position, a closure member carried by the discharge end of said casing and having an annular seat adapted to engage said obturating member, said annular seat having a truncated conical face adapted to engage said second conical portion of said obturating member, the apex angle of the cone defining said seat being slightly greater than the apex angle of said second conical portion, means for effecting selective closing and opening axial movement of said closure member relative to said obturating member to selectively position said seat in engagement with and spaced apart from said second conical portion, and means for holding said obturating and closure members in fixed positions relative to one another at all positions of said seat relative to said second conical portion, said seat and said obturating member defining an annular discharge orifice at all possible spaced apart positions of said seat relative to said obturating member.

8. An angle cock comprising, in combination, a hollow casing defining a flow channel, said casing having a spigot end and an angularly related discharge end with the junction between the portions of said channel in said spigot and discharge ends being formed as a fluent bend, the discharge end of said casing terminating in an enlarged portion defining a widened flow channel downstream of said bend, an internal annular groove formed in the enlarged portion of said casing, an obturating member positioned in the widened portion of said channel and defining with said discharge end an annular passageway, a spider having an annular rim and a plurality of angularly spaced apart spokes for supporting said obturating member with said spokes interconnecting said obturating member and said rim, said rim mounted in said groove, at least one of said spider and said casing being made of a resilient deformable material so as to permit said rim to be snapped into said annular groove and retained therein by the resiliency of the material, a closure member carried by said discharge end of said casing and defining an annular seat adapted to engage said obturating member, means for effecting selective closing and opening axial movement of said closure member relative to said obturating member to selectively position said seat in engagement with and spaced from said obturating member, and means for holding said obturating and closure members in fixed positions relative to one another at all positions of said seat relative to said obturating member, said seat and said obturating member defining an annular discharge orifice at all possible spaced apart positions of said seat relative to said obturating member.

References Cited in the file of this patent

UNITED STATES PATENTS

| | | |
|---|---|---|
| 877,540 | Wood | Jan. 28, 1908 |
| 1,496,338 | Haley | June 3, 1924 |
| 1,615,181 | Swacker | Jan. 18, 1927 |
| 2,571,327 | Agudo | Oct. 16, 1951 |
| 2,865,596 | Monnig | Dec. 23, 1958 |

FOREIGN PATENTS

| | | |
|---|---|---|
| 29,704 | Great Britain | May 29, 1913 |
| 551,475 | Great Britain | Feb. 24, 1943 |
| 582,397 | France | Oct. 13, 1924 |
| 1,137,011 | France | Jan. 7, 1957 |